United States Patent

Rengakuji et al.

(10) Patent No.: US 6,602,607 B2
(45) Date of Patent: Aug. 5, 2003

(54) TITANIUM DOXIDE PHOTOCATALYST CARRIER AND PROCESS FOR ITS PRODUCTION

(75) Inventors: Seiichi Rengakuji, 8-27-110, Awashima 1-chome, Toyama-shi, Toyama-Ken 931-8314 (JP); Yosuke Hara, Shibukawa (JP); Akihiro Shinagawa, Shibukawa (JP)

(73) Assignees: Seiichi Rengakuji, Toyama (JP); Japan Carlit Co., Ltd., Tokyo (JP); Shin Nikkei Company, Ltd., Tokyo (JP); Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/817,350

(22) Filed: Mar. 27, 2001

(65) Prior Publication Data

US 2002/0025428 A1 Feb. 28, 2002

(30) Foreign Application Priority Data

Jun. 1, 2000 (JP) ........................................ 2000-164213

(51) Int. Cl.[7] ............................................... B32B 17/06
(52) U.S. Cl. ........................ 428/432; 428/448; 428/469; 428/472; 428/697; 428/699; 428/701; 428/702; 428/908.8; 428/913; 427/165; 427/374.1; 427/376.2; 427/376.3; 427/419.2; 427/419.6; 427/419.8
(58) Field of Search .................................. 428/428, 432, 428/448, 469, 472, 697, 699, 701, 702, 908.8, 913; 427/165, 374.1, 376.2, 376.3, 419.2, 419.6, 419.8

(56) References Cited

U.S. PATENT DOCUMENTS 6,037,289 A * 3/2000 Chopin et al. ......... 106/287.16

FOREIGN PATENT DOCUMENTS

| JP | 11-222690 | 8/1999 |
| JP | 2000-273647 | 10/2000 |

OTHER PUBLICATIONS

S. Kinoshita, et al., Toyama Univ., Yokohama National Univ., 1 page,2F17, "Photocatalysis of $TiO_2$ Thin Films, and Photocurrent Caused by Irradiation" (No date).

Oh–J. Num, et al., Yokohama National Univ., Toyama Univ., p. 132, 2F18, "The Photocatalytic Activity of $TiO_2$ Films" (No date).

Yuuko Nakamura, et al., Journal of Technology and Education, vol. 8, No. 2, p. 7, 3P08, "Application of $TiO_2$, $ZrO_2$ and Their Mixture Films to Co Gas Sensor by Thermal Conductivity Method", Dec. 1999 (with English Abstracts).

Seichi Rengakuji, et al., Journal of Technology and Education, vol. 9, No. 1, p. 390 and 29, 3P09, "Preparation of $TiO_2$ Thin Film From Precursor Oxide Solution", Apr. 6, 2000.

* cited by examiner

Primary Examiner—Cathy Lam
Assistant Examiner—Andrew T Piziali
(74) Attorney, Agent, or Firm—Oblon, Spivak, McClelland, Maier & Neustadt, P.C.

(57) ABSTRACT

A titanium dioxide photocatalyst carrier is prepared by coating a surface of a substrate with a titanium dioxide precursor solution prepared from a hydrolyzable titanium compound and an aromatic compound solvent, and then heat-treating the coated substrate thereby preparing a carrier coated with a thin layer of titanium oxide.

10 Claims, 1 Drawing Sheet

FIG. 1
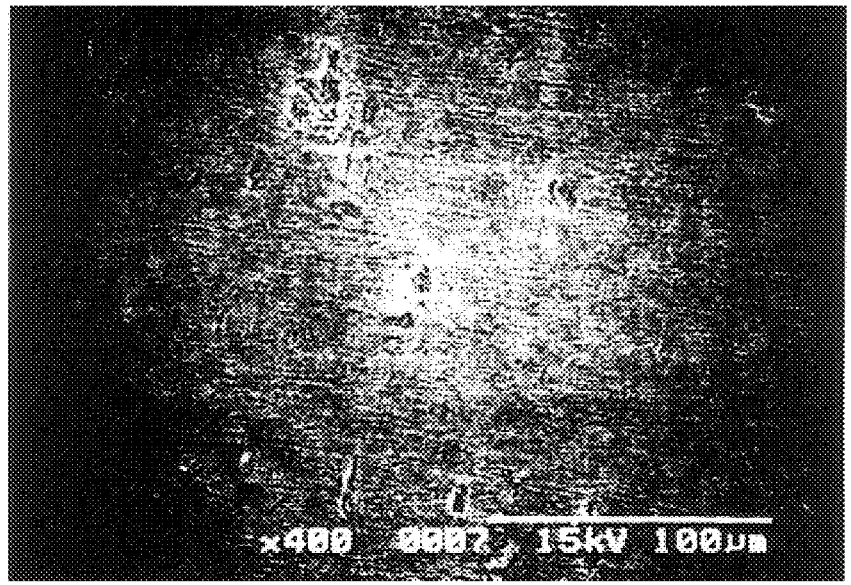
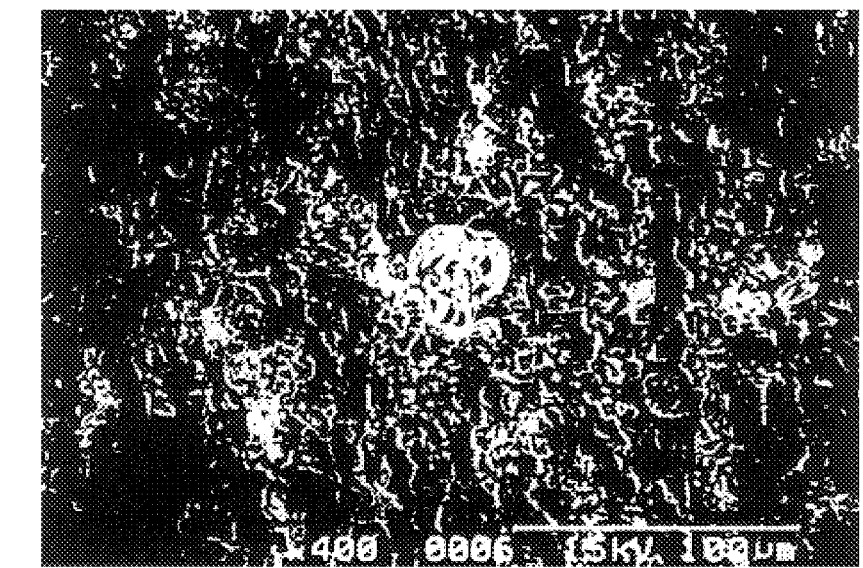
FIG. 2
PRIOR ART

TITANIUM DIOXIDE PHOTOCATALYST CARRIER AND PROCESS FOR ITS PRODUCTION

BACKGROUND OF THE INVENTION

1. Field of the Invention

The present invention relates to a titanium dioxide photocatalyst carrier having a photocatalytic activity and a process for its production.

2. Discussion of Background

In recent years, a research for hydrophilic, antibacterial or antifouling coating by titanium dioxide (titania, $TiO_2$) has attracted an attention. Such a research is one utilizing a photocatalytic effect of titanium dioxide, and for example, a hydrophilic antifouling coat having titanium dioxide coated (JP-A-8-267646) and improvement of a photocatalytic activity by mixing it with a noble metal (JP-A-6-198196, JP-A-6-278241) have been reported.

On the other hand, a technique to form a thin layer of an oxide containing a titanium oxide as the main component, by carrying out a reactive direct current (DC) sputtering method in an oxidizing atmosphere by means of a metal target containing titanium as the main component, is common and has already been used for the production of heat reflecting glass, etc. However, the titanium dioxide layer obtainable by this method is amorphous from the viewpoint of X-rays and shows no substantial photocatalytic activity. Further, the sputtering method requires an expensive apparatus and is a method not suitable for mass production on an industrial scale.

As a method for forming a titanium dioxide layer showing a photocatalytic activity, a method of fixing fine particles of titanium dioxide by an organic or inorganic binder, or a metal organic decomposition (MOD) method which comprises coating and drying a metal organic solution to form an agglomerate of fine oxide powder and then subjecting it to heat treatment while supplying oxygen to form a -M-O-M- structure, has heretofore been known. Further, a sol (solution)-gel (solid) method is known wherein a metal alkoxide is dissolved in a suitable solvent such as an alcohol, this solution is subjected to hydrolytic condensation polymerization to prepare a polymer sol (colloidal dispersion), which is coated on a substrate, followed by drying and heat treatment for crystallization. This method has had a problem that it is difficult to store the dispersion in the sol state under a constant state for a long period of time, and a sol solution once used, can not be re-used, since the dispersion in the sol state is gelled in the solution to precipitate on a substrate for forming a layer, whereby a non-reacted product will also be gelled.

Fujishima Akira et al have reported in preparatory papers for the 6th symposium (at Tokyo University on Nov. 26, 1999) of Optically Functional Material Research Association, p. 158, that an alcohol dispersion of titanium oxide was formed into a layer by a sol-gel method on Nesa glass [which has a $SnO_2$ (fluorine containing) layer on a glass], followed by baking at 500° C. for 30 minutes. The titanium dioxide layer formed on the Nesa glass obtained by this method, was reported to have the decomposition rate of 2-propanol vapor by a photocatalytic reaction improved by about 1.2 times, as compared with a titanium dioxide layer formed on a silica-coated Pyrex glass.

However, the method or the sol-gel method has a problem such that it is difficult to obtain a uniform layer thickness over a large area such as a window glass, the surface smoothness of the layer is poor, or the abrasion resistance of the layer is inadequate.

SUMMARY OF THE INVENTION

The present invention has an object to provide a titanium dioxide photocatalyst carrier which exhibits a high photocatalytic activity and which has, as a surface layer, titanium dioxide excellent in the abrasion resistance.

Further, the present invention has an object to provide the above titanium dioxide carrier which exhibits a high photocatalytic activity and which is excellent also in the alkali resistance or the abrasion resistance.

Namely, the present invention provides a titanium dioxide photocatalyst carrier having a thin layer of titanium dioxide, which is formed by coating and heat-treating a titanium dioxide precursor solution prepared from a hydrolyzable titanium compound and an aromatic compound solvent, on a substrate surface.

Here, the change in the visible light transmittance as between before and after carrying out a Taber abrasion test on the surface of the thin layer of titanium dioxide by a truck wheel of CS-10F under such conditions as a load of 4.9N and 200 rotations, is preferably at most 5%.

Further, the present invention provides the titanium dioxide photocatalyst carrier which has a layer to prevent diffusion of an alkali component from the substrate to the thin layer of titanium dioxide, or a charge separation layer, between the substrate and the thin layer of titanium dioxide.

It is preferred that the geometrical thickness of the thin layer of titanium dioxide is from 5 to 1,000 nm, or the substrate is a glass substrate.

Further, it is preferred that the titanium dioxide precursor solution is one obtained by dissolving the hydrolyzable titanium compound in the aromatic compound solvent, followed by hydrolysis/dehydration condensation. The aromatic compound solvent is preferably at least one member selected from the group consisting of benzene, toluene, xylene and ethylbenzene. Further, the hydrolyzable titanium compound is preferably a titanium alkoxide.

Further, the present invention provides a process for producing a titanium dioxide photocatalyst carrier having a thin layer of titanium dioxide, which comprises coating and heat-treating a titanium dioxide precursor solution prepared from a hydrolyzable titanium compound and an aromatic compound solvent, on a substrate surface.

BRIEF DESCRIPTION OF THE DRAWINGS

FIG. 1 is a schematic view showing a copy of a SEM photograph of the surface of a thin layer of titanium dioxide on a float glass sheet formed in Example 1.

FIG. 2 is a schematic view showing a copy of a SEM photograph of the surface of a thin layer of titanium dioxide on a float glass sheet formed in Comparative Example 1.

DETAILED DESCRIPTION OF THE PREFERRED EMBODIMENTS

The present invention is a titanium dioxide photocatalyst carrier having a thin layer of titanium dioxide, which is formed by coating a titanium dioxide precursor solution prepared from a hydrolyzable titanium compound and an aromatic compound solvent, on a substrate, followed by heat treatment.

The thin layer of titanium dioxide to be formed, has a high abrasion resistance and is excellent in the photocatalytic activity.

The solution prepared from the hydrolyzable titanium compound and the aromatic solvent is not a sol obtainable by a conventional method i.e. an agglomerate comprising fine particulate hydrous titanium oxide as units, but is a solution of a polymeric titanium dioxide precursor having a planar structure wherein the aromatic ring of the aromatic compound solvent serves as a nucleus, and dehydration condensation of titanium hydroxide has proceeded based on the plane of the aromatic ring.

Now, an example of the method for preparing the titanium dioxide precursor solution to be used in the present invention, will be shown.

The solution to be used in the present invention, may be prepared, for example, by dissolving a titanium alkoxide in an amount of from 0.03 to 1.5 mols per one liter of the aromatic compound solvent, then a water/alcohol mixed solution containing from 1 to 20 wt % of water is added at a temperature of from 0 to 6° C. in an amount such that water is from 0.5 to 2 mols per mol of the titanium alkoxide, followed by hydrolysis and dehydration condensation at a temperature of from 0 to 60° C. under ultrasonic waves or with stirring. Preferably, a solution having the concentration of titanium ions concentrated to a level of from 0.1 to 1 mol/l, is used. The obtained solution is a solution of a polymeric titanium dioxide precursor having a planar structure wherein the aromatic ring of the aromatic compound solvent serves as a nucleus, and dehydration condensation of titanium hydroxide has proceeded based on the plane of the aromatic ring.

The alkoxy group of the titanium alkoxide has a carbon number of from 1 to 8, preferably from 1 to 5. As an example, an ethoxy group, a n-propoxy group, an iso-propoxy group, a n-butoxy group, an iso-butoxy group, a sec-butoxy group, a tert-butoxy group or a n-pentoxy group may be mentioned.

The solvent to dissolve the titanium alkoxide is an aromatic compound solvent, and one or more types may be employed. As an example, benzene, aniline, toluene, xylene or ethylbenzene may be mentioned. Particularly when benzene is used, a trimer or a titanium alkoxide can readily be formed, and the structure of the reaction product can be controlled.

The alcohol in the water/alcohol mixed solution to be added to the aromatic compound solvent having the titanium alkoxide dissolved, is one to control the activity of water i.e. to suppress the hydrolysis and thereby to let the reaction proceed slowly. Accordingly, the blend proportions of the water/alcohol mixed solution, the adding speed and the temperature at the time of the addition, are also important for the control of the reaction, and it is necessary to let the reaction proceed slowly at the initial stage. If the reaction proceeds rapidly, an agglomerate of fine particulate titanium dioxide will be formed, such being undesirable.

The alcohol to be used in the present invention is an alcohol having a carbon number of from 1 to 10, preferably a monohydric alcohol having a carbon number of 1 to 10. One or more of them may be employed. As an example, ethyl alcohol, n-propyl alcohol, iso-propyl alcohol, n-butyl alcohol, iso-butyl alcohol, sec-butyl alcohol, tert-butyl alcohol, n-amyl alcohol, isoamyl alcohol, n-hexyl alcohol, n-heptyl alcohol, n-octyl alcohol, nonyl alcohol or n-decyl alcohol may be mentioned.

The content of water in the water/alcohol mixed solution to be used in the present invention, is from 1 to 20 wt %, and in the water/alcohol mixed solution to be added to the aromatic compound solvent having the titanium alkoxide dissolved, water is in an amount of from 0.5 to 2 mols per mol of the titanium alkoxide.

If the content of water in the water/alcohol mixed solution is less than 1 wt %, the reaction rate tends to be too slow, such being not practical. Further, in a case where it exceeds 20 wt %, the hydrolytic reaction proceeds rapidly, such being undesirable.

In the water/alcohol mixed solution to be added to the aromatic compound solvent having the titanium alkoxide dissolved, if water is less than 0.5 mol per mol of the titanium alkoxide, the unreacted material tends to be large, such being undesirable. Further, if it exceeds 2 mols, the reaction tends to proceed rapidly, such being undesirable.

Further, the temperature at the time of adding the water/alcohol mixed solution to the aromatic compound solvent having the titanium alkoxide dissolved, is preferably from 0 to 6° C. from the viewpoint of the control of the reaction.

Then, after adding the water/alcohol mixed solution to the aromatic compound solvent having the titanium alkoxide dissolved, hydrolysis and dehydration condensation are carried out at a temperature of from 0 to 60° C. with supersonic waves or with stirring, to obtain the solution to be used in the present invention.

If the temperature at the time of the hydrolysis and dehydration condensation exceeds 60° C., the reaction tends to be too rapid, and if it is lower than 0 C., the reaction inversely tends to be too slow, such being undesirable.

The solution to be used in the present invention comprises polymeric titanium dioxide having a planar structure wherein the aromatic ring in the aromatic compound solvent serves as a nucleus, and the dehydration condensation of titanium hydroxide has proceeded based on the plane of the aromatic ring, and it is not a colloidal solution of fine particulate titanium hydrate oxide obtainable by a conventional sol-gel method.

Then, a solution having titanium ions preferably adjusted to a concentration of from 0.1 to 1 mol/l, is coated by e.g. brush coating in an atmosphere having a low humidity, spray coating, dipping, spin coating or flow coating and then dried at a temperature of from 120 to 250° C.

Then, after the drying, heat treatment is carried out at temperature of from 300 to 650° C. for from 30 minutes to one hour, followed by natural cooling to room temperature. If the heat treatment is carried out under these conditions, a surface layer having a high photocatalytic effect can be obtained, and there will be no possibility of softening of the glass substrate, such being desirable.

The thickness of the thin layer of titanium dioxide in the present invention is preferably such that the geometrical thickness is from 5 to 1000 nm. If the thickness is less than this range, no adequate photocatalytic effect tends to be obtained, and if it exceeds this range, such is not economical. A more preferred range can be freely determined depending upon the particular purpose and application of the photocatalyst carrier. It is particularly preferably from 10 to 500, further preferably from 10 to 100 nm.

Further, the thin layer of titanium dioxide in the present invention, is excellent in the abrasion resistance.

The abrasion resistance of the layer can be evaluated, for example, by a Taber abrasion test by a truck wheel of CS-10F under a load of 500 g (4.9 N), as stipulated in JIS R3221. The layer is preferably such that the change in the visible light transmittance as between before and after the above Taber abrasion test (200 rotations) is at most 5%, more preferably at most 1%, particularly preferably at most 0.5%.

One evaluated by an abrasion resistance test by means of any other measuring method, will be contained in the present invention so long as it has an abrasion resistance equal to the above.

The photocatalytic activity of titanium dioxide can be evaluated, for example, by the method disclosed in Examples, and the thin layer of titanium dioxide of the present invention is excellent in the photocatalytic activity.

In the present invention, the substrate on which the thin layer is formed, is not particularly limited with respect to e.g. the material, the surface shape or the structure.

The material of the substrate may, for example, be ceramics such as glass or porcelains; a polymer material such as a resin, rubber, paper or cloth; a metal or an alloy of e.g. titanium or aluminum; or a composite material thereof.

Among them, glass may be used in a wide range of applications, and it is a preferred embodiment of the present invention that the substrate is a glass substrate.

The type of glass is not particularly limited. For example, an oxide glass may be mentioned.

The oxide glass may, for example, be a silicate glass, a phosphate glass or a borate glass.

The silicate glass may, for example, be soda lime glass, silicic acid glass, an alkali silicate glass, potash lime glass, lead (alkali) glass, borosilicate glass or aluminosilicate glass.

The surface shape of the substrate is not limited to one having a flat surface such as a sheet product, and may be stereoscopic. The solution to be used in the present invention will be coated in a liquid state. Nevertheless, it is excellent in the step covering property such that even in a shape having irregularities, the difference in the layer thickness between the recessed portions and the projected portions is small. Accordingly, the thin layer can be formed on a substrate having a complex surface shape.

Further, it may be made to have a multilayer structure having at least one functional layer between the substrate and the surface layer. As such a functional thin layer, a functional thin layer of e.g. a metal, an alloy or an oxide, nitride or carbide thereof, may, for example, be mentioned. Specifically, it may, for example, be a silica ($SiO_2$) layer as a layer (alkali barrier layer) to prevent diffusion of the alkali component (particularly the sodium component) from the substrate (particularly the soda lime glass substrate) to the thin layer of titanium dioxide, or a layer which serves as a charge separating layer.

The alkali barrier layer is not particularly limited, and it may, for example, be a zinc oxide (ZnO), zirconia ($ZrO_2$) or silica ($SiO_2$) layer. Usually, a silica ($SiO_2$) layer is employed. In this case, phosphorus or the like may be added in order to increase the performance for trapping sodium ions. The method for forming the layer is not particularly limited, and a known method may be employed such as a sputtering method or a liquid phase method. The preferred layer thickness range is from 5 to 500 nm.

The charge separating layer may be any layer so long as it is layer having a function to prevent reunion of holes which takes place when the surface layer of the titanium dioxide layer receives light irradiation and undergoes a charge separation. However, a layer of e.g. $SnO_2$, Si or ITO (indium-tin oxide) may, for example, be mentioned. It may happen that depending upon the substance doped in the layer (such as fluorine in the tin oxide layer), the layer performance is impaired, and accordingly, it is preferred to study the doping material. A preferred layer thickness range is from 5 to 500 nm.

The applications of the laminate of the present invention are not particularly limited. As applications utilizing the antibacterial property, the antifouling property or the abrasion resistance attributable to a high photocatalytic activity of the titanium dioxide layer, for example, glass for vehicles such as automobiles, window glass for houses, mirror, cathode ray tubes, fluorescent lamps, highway lamps (such as sodium lamps or mercury lamps); tiles in an operation room or the like; kitchen sinks, wash basins; semiconductor lasers, or semiconductor devices may be mentioned. Further, an application as a photoelectric cell may also be considered.

Now, the present invention will be described specifically with reference to Examples. However, the present invention is by no means restricted thereto.

Preparation of Titanium Dioxide Precursor Solution

In benzene as an aromatic compound solvent, titanium n-butoxide as a metal salt, was dissolved in an amount of 0.5 mol/l, followed by refluxing for 10 hours. Then, a water/butanol solution containing 5 wt % of water, was dropwise added at a temperature of 6° C., so that water would be 0.5 mol per mol of titanium n-butoxide, followed by heating at 60° C. for 10 hours, so that hydrolysis and dehydration condensation reaction were carried out with stirring, and the solution thereby obtained was concentrated by an evaporator to adjust the concentration so that titanium ions would be 1 mol/l. The prepared solution was stable even upon expiration of 1 year, when stored in a cool dark place.

Production of Thin Layer of Titanium Dioxide

EXAMPLE 1

A preliminarily cleaned float glass sheet made of soda lime glass having a nominal thickness of 3 mm, was dipped in a solution having the concentration previously adjusted, then, withdrawn at a rate of 7.5 mm/min by means of a stepping motor and dried at 125° C. in a benzene saturated vapor by indirect irradiation from outside a glass container by an infrared lamp distanced by about 20 cm from the float glass substrate, and then, it was once again dipped and dried. Further, it was subjected to heat treatment at a temperature of 465° C. for 30 minutes and then naturally cooled to room temperature to let a thin layer of titanium dioxide form on the float glass sheet. The thickness of the obtained thin layer of titanium dioxide was measured by means of a stylus surface roughness meter, whereby it was about 80 nm.

A SEM (scanning electron microscope) photograph of the surface of the obtained thin layer of titanium dioxide, is shown in FIG. 1. The SEM photograph of the surface shows that a uniform thin layer of titanium dioxide free from cracks, was formed.

EXAMPLE 2

A thin layer of titanium dioxide having a thickness of 40 nm was formed in the same manner as in Example 1 on a preliminarily cleaned float glass sheet having a nominal thickness of 3 mm, and coated with a transparent conductive layer of $SnO_2$ having a layer thickness of 300 nm.

COMPARATIVE EXAMPLE

A thin layer of titanium dioxide was formed by a sol-gel method in accordance with the method disclosed by T. Yoko, K. Kamiya and S. Sakka, Yogyo Kyokaishi 95, 150 (1987).

Preparation of Solution

At room temperature, 0.1 mol of titanium isopropoxide and 0.4 mol of dry ethanol were mixed and stirred and then cooled to a temperature of 0° C. Then, with stirring, a mixed solution comprising 0.4 mol of dry ethanol, 0.1 mol of water and 0.008 mol of hydrochloric acid, was dropwise added, followed by hydrolysis at room temperature to obtain an oxide sol. The dispersion stability of fine particles of the metal oxide in the sol was from about 1 to 3 months.

Preparation of Thin Layer

Comparative Example 1

A preliminarily cleaned float glass sheet made of soda lime glass having a nominal thickness of 3 mm, was dipped in the oxide sol previously prepared, then withdrawn at a rate of 9 mm/min by means of a stepping motor and dried. Further, it was subjected to heat treatment at a temperature of 580° C. for 30 minutes and then naturally cooled to room temperature to let a thin layer of titanium dioxide form on the float glass sheet. The thickness of the obtained thin layer of titanium dioxide was measured by means of a stylus surface roughness meter, whereby it was about 80 nm.

A SEM photograph of the surface of the obtained thin layer of titanium dioxide is shown in FIG. 2. The SEM photograph of the surface shows characteristic fine cracks specific to the thin layer of titanium dioxide formed by the sol wherein fine particles of a metal oxide are dispersed.

Comparative Example 2

A thin layer of titanium dioxide having a thickness of 80 nm was formed in the same manner as in Example 1 on a preliminarily cleaned float glass sheet having a nominal thickness of 3 mm and coated with a transparent conductive layer of $SnO_2$ having a layer thickness of 300 nm.

(1) Hydrophilicity-Maintaining Property in a Dark Place

The float glass sheets having thin layers formed, obtained in Examples 1 and 2 and Comparative Example 1, were used.

Samples were left in a dark place in a room, whereby the change with time of the contact angle of water was measured.

(2) Initial Hydrophilicity

Samples used for the evaluation of the hydrophilicity-maintaining property in a dark place, were used. A sample having a contact angle of water at a dark place in a room which exceeded 30°, was irradiated with BL (black-light ultraviolet lamp, center wavelength: 352 nm) of 1 $mW/cm^2$ for 24 hours, whereupon the contact angle of water was measured.

(3) Recovery of Hydrophilicity

The float glass sheets having thin layers formed, obtained in Examples 1 and 2 and Comparative Example 1, were used.

After measuring the initial contact angle of water, a stain on the layer surface was removed by ethanol, and then each sample was irradiated by BL (black-light ultraviolet lamp, center wavelength: 352 nm) of 1 $mW/cm^2$ for 48 hours, whereupon the contact angle of water of each sample was measured.

(4) Photocatalytic Activity (Methylene Blue Decoloring Method)

The float glass sheets having thin layers formed, obtained in Examples 1 and 2 and Comparative Example 1, were used.

For cleaning and imparting hydrophilicity, the surface of the thin layer was irradiated with ultraviolet rays for 24 hours. Then, the test specimen of a 5 cm□ (5 cm×5 cm) was placed in a petri dish having an internal diameter of 9 cm so that the layer side faced above, and 30 g of an aqueous solution containing 8 ppm of methylene blue, was introduced, followed by irradiation with BL of 1 $mW/cm^2$ for 3 hours. Then, the methylene blue liquid was withdrawn, and the visible light transmittance at 665 nm being the absorption peak of methylene blue, was measured, and the change ($\Delta ABS$) from the initial value of absorbance was calculated. The larger the $\Delta ABS$, the higher the photocatalytic activity. The initial value of absorbance was determined in such a manner that the non-treated glass was put into a petri dish, and the absorbance of methylene blue after irradiation with BL for 3 hours, was measured, and the measured value was taken as the initial value.

(5) Photocatalytic Activity (Engine Oil Decomposition Rate)

The float glass sheets having thin layers formed, obtained in Examples 1 and 2 and Comparative Example 1, were used. For cleaning and imparting hydrophilicity, the surface of the thin layer was irradiated with ultraviolet rays for 24 hours. Then, 0.2 ml of engine oil was dropped on the thin layer and left for 1 hour. Then, it was washed with water and then irradiated with BL of 1 $mW/cm^2$, whereby the contact angle of water was measured with time. The reduction rate of the contact angle of water was calculated, and taken as the engine oil decomposition rate, which was used for evaluation of the photocatalytic activity of the titanium dioxide layer. The larger the engine oil decomposition rate, the higher the photocatalytic activity. (The − value represents the reduction rate of the angle of water, and the + value represents the increasing rate of the angle of water.)

(6) Abrasion Resistance

The float glass sheets having thin layers formed, obtained in Examples 1 and 2 and Comparative Examples 1 and 2, were used.

A Taber abrasion test (200 rotations) was carried out under a load of 500 g (4.9N) using a truck wheel of CS-10F as stipulated in JIS R3221, whereby the change in the visible light transmittance and the change in the haze value as between before and after the Taber abrasion test, were measured.

(7) Wear Resistance

The float glass sheets having thin layers formed, obtained in Examples 1 and 2 and Comparative Examples 1 and 2, were used.

A felt having Kanto loam dust (particle size) infiltrated (water: 300 cc/dust: 15 g) was slided 60 times, and the change in the visible light transmittance as between before and after the sliding was measured. Further, the contact angle of water after the sliding was measured by the method shown in the above (3). (The − value of ΔTt represents an increase of the visible light transmittance, and the + value of ΔTt represents a decrease of the visible light transmittance.)

(8) Alkali resistance

The float glass sheets having thin layers formed, obtained in Examples 1 and 2 and Comparative Examples 1 and 2, were used.

A sample was immersed in a NaOH solution of 0.1 mol/l at 90° C. and taken out upon expiration of 2 hours, whereupon the presence or absence of peeling of the layer was confirmed, and the change in the visible light transmittance as between before and after the alkali resistance test was measured. (The − value of ΔTt represents an increase of the visible light transmittance, and the + value of ΔTt represents a decrease of the visible light transmittance.)

(9) Antifouling Self Cleaning Property

The float glass sheets having thin layers formed, obtained in Examples 1 and 2 and Comparative Examples 1 and 2, were used.

After natural exposure, water was sprayed artificially to evaluate whether or not the stain was readily removed. The case where the stain was readily removed, was identified by ○.

The results are shown in Tables 1 to 4. In the Tables, G represents a glass sheet.

It is evident that those having the thin layers produced by the present invention as the surface layers (Examples 1 and 2) show high photocatalytic activities and are excellent in the abrasion resistance and the wear resistance as well as in the alkali resistance. It is evident that especially when a sample has an interlayer, it shows a high photocatalytic activity even when the layer thickness is thin as compared with the conventional method.

TABLE 1

| | Sample construction (the numeral in the brackets ( ) represents the geometrical thickness of the thin layer (nm)) | Hydrophilicity-maintaining property in a dark place (number of days during which the contact angle of water of 30° is maintained) | Initial hydrophilicity (contact angle of water (°)) | Recovery of hydrophilicity (contact angle of water (°)) |
|---|---|---|---|---|
| Examples | | | | |
| 1 | G/TiO₂ (80) | 6 days | <5 | <5 |
| 2 | G/SnO₂ (300)/TiO₂ (40) | 1 day | <5 | <5 |
| Comparative Examples | | | | |
| 1 | G/TiO₂ (80) | 18 days | <5 | <5 |
| 2 | G/SnO₂ (300)/TiO₂ (80) | | | |

TABLE 2

| | Sample construction (the numeral in the brackets ( ) represents the geometrical thickness of the thin layer (nm)) | Photocatalytic activity (methylene blue decomposition performance, ΔABS/after 3 h) | Photocatalytic activity (engine oil decomposition performance, contact angle with water °/h) |
|---|---|---|---|
| Examples | | | |
| 1 | G/TiO₂ (80) | 0.396 | −8°/h |
| 2 | G/SnO₂ (300)/TiO₂ (40) | 0.247 | −9°/h |
| Comparative Examples | | | |
| 1 | G/TiO₂ (80) | 0.202 | 2.4°/h |
| 2 | G/SnO₂ (300)/TiO₂ (80) | | |

TABLE 3

| Sample construction (the numeral in the brackets ( ) represents the geometrical thickness of the thin layer (nm)) | Abrasion resistance | | | Wear resistance | | |
|---|---|---|---|---|---|---|
| | Presence or absense of peeling of the layer | ΔTt (%) | ΔHz (%) | Presence or absence of peeling of the layer | ΔTt (%) | Recovery of hydrophilicity (contact angle of water (°)) |
| Examples | | | | | | |
| 1 G/TiO₂(80) | Absence | 0.1 | −2.0 | Absence | 0.7 | 8.5 |
| 2 G/SnO₂(300)/TiO₂(40) | Absence | 4.0 | −1.1 | Absence | −4.0 | 2.5 |
| Comparative Examples | | | | | | |
| 1 G/TiO₂(80) | Presence | — | — | Presence | — | — |
| 2 G/SnO₂(300)/TiO₂(80) | Presence | — | — | Presence | — | — |

TABLE 4

| Sample construction (the numeral in the brackets ( ) represents the geometrical thickness of the thin layer (nm)) | Alkali resistance | | Antifouling self-cleaning property (artificial spraying of water) |
|---|---|---|---|
| | Presence or absence of peeling of the layer | ΔTt (%) | |
| Examples | | | |
| 1  G/TiO$_2$ (80) | Absent | 4.0 | ○ |
| 2  G/SnO$_2$ (300)/TiO$_2$ (40) | Absent | −2.2 | ○ |
| Comparative Examples | | | |
| 1  G/TiO$_2$ (80) | Peeling over the entire surface | — | ○ |
| 2  G/SnO$_2$ (300)/TiO$_2$ (80) | Peeling over the entire surface | — | ○ |

The titanium dioxide photocatalyst carrier of the present invention has a uniform thin layer of titanium dioxide free from cracks and having a high catalytic activity and is excellent in the abrasion resistance, the wear resistance and the alkali resistance.

What is claimed is:

1. A titanium dioxide photocatalyst carrier, prepared by a process comprising:

coating a surface of a substrate with a titanium dioxide precursor solution prepared from a hydrolyzable titanium compound and an aromatic compound solvent; and then heat-treating the coated substrate thereby preparing a carrier coated with a thin layer of titanium oxide.

2. The titanium dioxide photocatalyst carrier according to claim 1, wherein the change in the visible light transmittance as between before and after carrying out a Taber abrasion test on the surface of the thin layer of titanium dioxide by a truck wheel of CS-10F under such conditions as a load of 4.9N and 200 rotations, is at most 5%.

3. The titanium dioxide photocatalyst carrier according to claim 1, which further comprises coating a layer on the substrate prior to coating said layer of titanium dioxide thereon, which layer prevents diffusion of an alkali component from the substrate into the thin layer of titanium dioxide.

4. The titanium dioxide photocatalyst carrier according to claim 1, which further comprises coating a charge separation layer on the substrate prior to coating said layer of titanium dioxide thereon.

5. The titanium dioxide photocatalyst carrier according to claim 1, wherein the geometrical thickness of the thin layer of titanium dioxide is from 5 to 1,000 nm.

6. The titanium dioxide photocatalyst carrier according to claim 1, wherein the substrate is a glass substrate.

7. The titanium dioxide photocatalyst carrier according to claim 1, wherein the hydrolyzable titanium compound is a titanium alkoxide.

8. The titanium dioxide photocatalyst carrier according to claim 1, wherein the aromatic compound solvent is at least one member selected from the group consisting of benzene, toluene, xylene and ethylbenzene.

9. The titanium dioxide photocatalyst carrier according to claim 1, wherein the titanium dioxide precursor is obtained by dissolving the hydrolyzable titanium compound in the aromatic compound solvent, followed by hydrolysis/dehydration condensation.

10. A process, which comprises:

coating a surface of a substrate with a titanium dioxide precursor solution prepared from a hydrolyzable titanium compound and an aromatic compound solvent; and then heat-treating the coated substrate thereby preparing a carrier coated with a thin layer of titanium oxide.

* * * * *